United States Patent [19]
Morgan

[11] Patent Number: 5,972,059
[45] Date of Patent: Oct. 26, 1999

[54] AIR FILTER ASSEMBLY

[75] Inventor: Lee Pendleton Morgan, Jonesboro, Ark.

[73] Assignee: Farr Company, El Segundo, Calif.

[21] Appl. No.: 09/238,298

[22] Filed: Jan. 28, 1999

[51] Int. Cl.⁶ .................................................. B01D 39/08
[52] U.S. Cl. ................................ 55/336; 55/498; 55/508; 55/521; 55/529
[58] Field of Search ............................ 55/336, 498, 508, 55/521, 529; 210/315, 317, 489, 497.01, 497.1, 497.3

[56] References Cited

U.S. PATENT DOCUMENTS

| | | | |
|---|---|---|---|
| 4,882,055 | 11/1989 | Stamstad | 55/521 |
| 5,522,909 | 6/1996 | Haggard . | |
| 5,549,722 | 8/1996 | Zemaitis et al. | 55/521 |
| 5,549,724 | 8/1996 | Mochida | 55/521 |
| 5,632,793 | 5/1997 | Haggard | 55/521 |
| 5,750,024 | 5/1998 | Spearman . | |

Primary Examiner—David A. Simmons
Assistant Examiner—Minh-Chau T. Pham
Attorney, Agent, or Firm—Edward A. Sokolski

[57] ABSTRACT

A filter assembly for use in filtering air in a dust collecting system has a pleated conical filter element which is mounted within a pleated cylindrical filter element. The cylindrical filter element is attached at one end to a base member and at the other end to a top member. The base portion of the conical element is attached to the base member. The apex of the conical member is closed off by a brace which has brackets thereon for supporting the conical member on the inner wall of the cylindrical member. Air to be cleaned is flowed into an aperture formed in the base portion and flows into the inner portion of the conical element with various portions of the air flowing through the filter walls of the conical element into the space between such walls and the cylindrical element. Air to be cleaned is also fed through the side portion of the cylindrical element into the space between the conical element and he cylindrical element with the filtered air being fed out through an aperture in the top member.

7 Claims, 2 Drawing Sheets

AIR FILTER ASSEMBLY

BACKGROUND OF THE INVENTION

1. Field of the Invention

This invention relates to air filters and more particularly to a filter assembly for use in dust collecting systems which utilizes a conical filter element mounted within a cylindrical filter element.

2. Description of the Related Art

In dust collecting systems, the air filters employed must be capable of filtering out fine particles of foreign matter such as dirt particles and dust to avoid their entry into the breathing space. Filters capable of filtering out fine particles offer considerable resistance to the flow of air. One way of alleviating this problem is to provide a large area filtering surface by successively bending a flat filtering media back and forth on itself to form a pleated or undulated configuration. Also, as described in U.S. Pat. No. 5,750,024 issued May 12, 1998 to Spearman, a conical filter element mounted within a cylindrical housing can be employed with the air to be cleaned fed into the base of the conical element with the filtered air being fed out from the space between the housing and the filter element. As the space between the conical element and the housing increases in the direction of flow, the velocity of the air flow tends to decrease which provides for more efficient filtering action.

The space occupied by a filter unit for a given amount of filtering action is often a critical factor. As noted above, the attainment of greater filtering action within a limited space can be achieved by pleating the filtering medium. The achievement of even greater filtering action within a given space is highly desirable.

SUMMARY OF THE INVENTION

The device of the present invention provides an improvement over the prior art in achieving greater filtering action within a given space. This end result is achieved by mounting a pleated conical filtering element within a pleated cylindrical filtering element. The conical element has its base portion attached to a base member which has an aperture formed therein. The top of the conical element is sealed by a brace which has brackets extending therefrom which are employed to support the conical element on the wall of the cylindrical element. The top of the cylindrical element is attached to a top member which has an aperture formed therein while the bottom of this element is attached to the base member which is apertured. Dirty air to be filtered is fed through the aperture of the bottom member to the interior of the conical element from where it flows through the filtering walls of this element into the space between the cylindrical and conical filter elements. The filtered air is exited through the aperture in the top member. Air to be filtered is also fed through the side walls of the cylindrical filter element into the space between the conical and cylindrical elements with the filtered air being exited through the aperture in the top member. In this manner air is filtered both through walls of the conical element and the cylindrical element.

It is therefore an object of this invention to provide improved filtering action in a filter occupying a given space.

It is a further object of this invention to provide a more compact filter capable of achieving improved filtering action.

Other objects of the invention will become apparent in view of the following description taken in connection with the accompanying drawings.

DETAILED DESCRIPTION OF THE INVENTION

Figure 1:
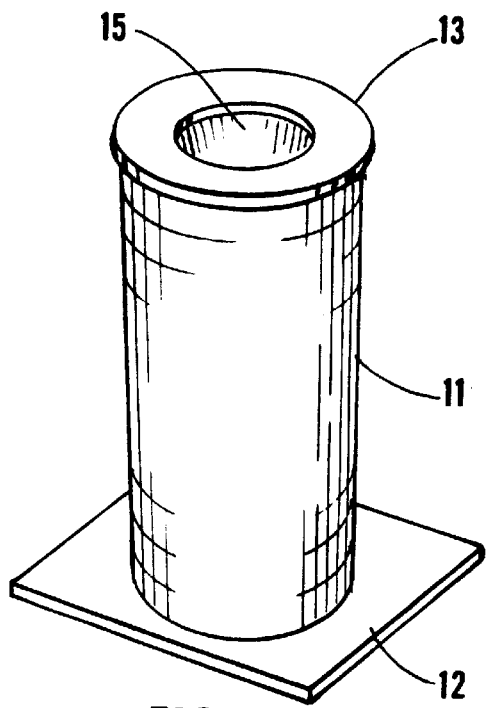
FIG. 1 is a front perspective view of a preferred embodiment of the device of the invention.
Figure 2:
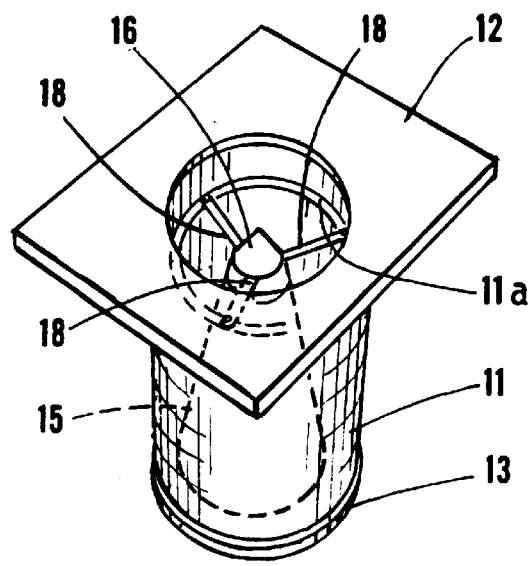
FIG. 2 is a top perspective view of the preferred embodiment.
Figure 3:
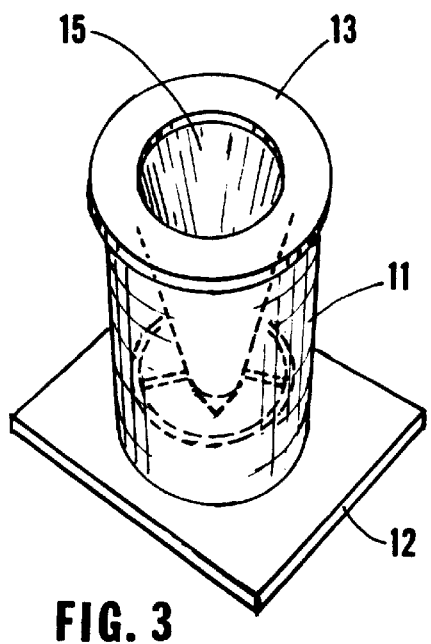
FIG. 3 is a bottom perspective view of the preferred embodiment.

Referring now to FIGS. 1–3, a preferred embodiment of the invention is illustrated. Cylindrical filter element 11 is attached by means of gasket 11b at its top end to top member 12 which is a flat piece fabricated of fiberboard or plastic which extends beyond the periphery of the cylindrical element. The top member has a circular aperture formed therein which mates with the aperture of filter element 11. The bottom end of the cylindrical filter element is attached to circular base member 13 near the edge if the base member. Base member 13 may be fabricated of a suitable plastic.

Conical filter element 15 is mounted within cylindrical filter element 11. The base portion of the conical filter element is attached to base member 13 at or near the periphery of the filter element's base portion. Base member 13 has an aperture formed therein which mates with the periphery of the base portion of the conical filter element. A brace 16 is attached to the apex of the conical cylindrical element and acts to hold the apex portion together and provide reinforcement therefor. A relatively rigid ring 11a made of metal or plastic is attached to the inner surface of cylindrical filter element 11. Brackets 18 which may be of metal or plastic are attached at one end to brace 16 and at the other end to ring 11a thereby providing support for the conical filter element on the cylindrical filter element.

The filter elements are fabricated of a suitable air filtering material such as cellulosic(paper) material or a polyester material which is pleated.

Figure 4:
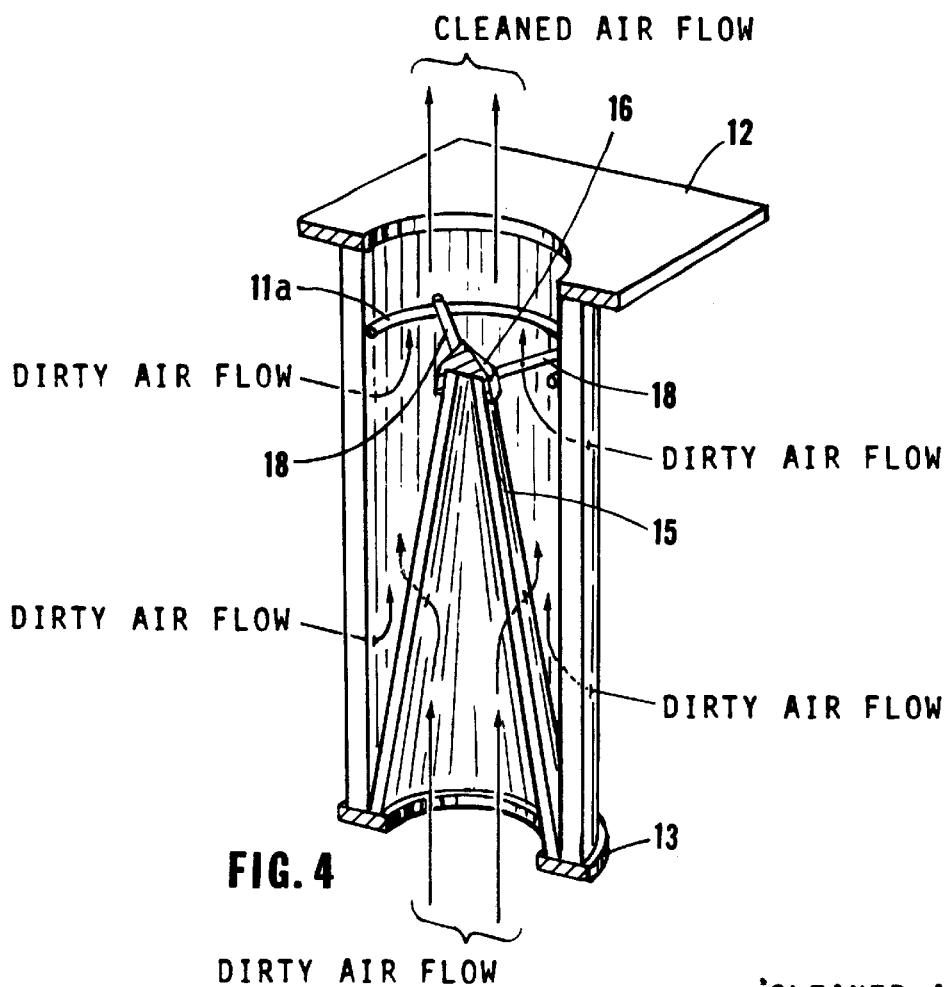
FIG. 4 is a vertical cross-sectional view of the preferred embodiment illustrating the operation thereof.

Referring now to FIG. 4, the operation of the device of the invention is illustrated. Dirty air to be filtered flows into the interior of conical filter element 15 through the aperture in base member 13. The air tends to take a spiral path passing through the walls of the conical filter element into the space between the conical and cylindrical filter elements. As this space increases gradually in going from the bottom to the top, the velocity of the air tends to decrease accordingly which makes for more efficient filtering action. Air to be filtered also passes through the walls of cylindrical filter element 11 and enters the space between the cylindrical and conical filter elements. The cleaned air exits through the aperture in the top member 12.

Figure 5:
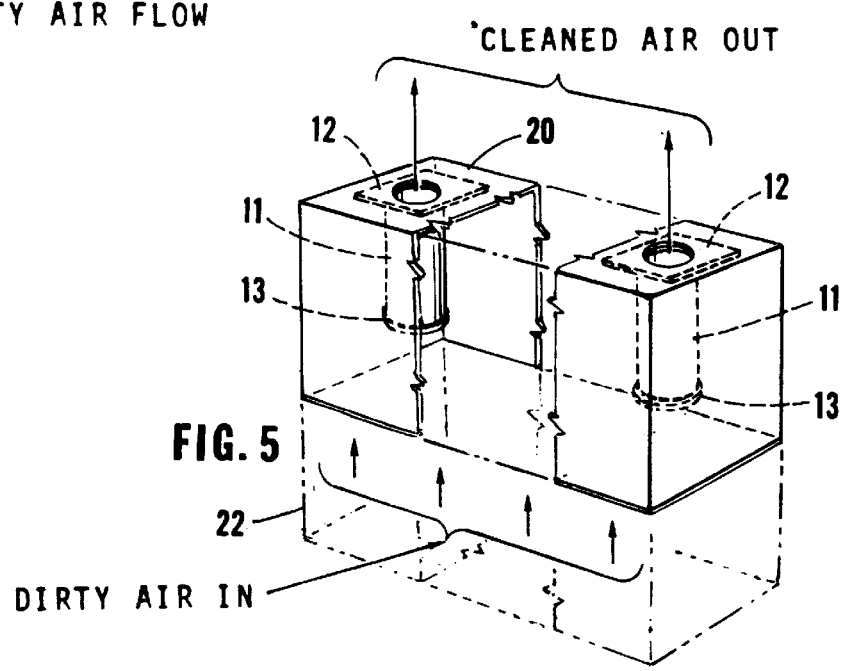
FIG. 5 is a diagrammatic view illustrating one way in which the filter units of the device of the invention may be installed.

Referring now to FIG. 5, a typical assembly of a plurality of filter units of the device of the invention is illustrated. A plurality of the filter units are mounted within a housing 20 which has an opening at its bottom with the air entering into a hopper 22 below. The top member 12 of each of the units is installed over a mating aperture formed in the top of the housing with the edges of the top member being sealed to the top wall of the housing by means of a gasket running around the periphery thereof.

While the invention has been described and illustrated in detail, this is intended by way of illustration and example only, the scope of the invention being limited by the terms of the following claims.

I claim:

1. An air filter assembly comprising:

a cylindrical air filter element;

a base member having an aperture formed therein;

a top member having an aperture formed therein;

the aperture of said top member being in opposing relationship to one end of said cylindrical air filter element, the aperture of said base member being in opposing relationship to the other end of said cylindrical air filter element;

an elongated conical filter element having an apex portion, the longitudinal outer wall of said conical filter element running opposite most of the longitudinal inner wall of said cylindrical filter element;

the aperture of said base member being in opposing relationship to the base portion of the conical filter element; and means for attaching the apex portion of said conical filter element to the inner wall of said cylindrical filter element;

air to be cleaned being fed into the interior of said conical filter element through the base portion thereof, said air passing through the walls of said conical filter element into the space between the outer wall of said conical filter element and the inner wall of said cylindrical filter element, air to be cleaned further being passed through the walls of said cylindrical filter element into the space between the outer wall of said conical filter element and the inner wall of said cylindrical filter element, the air in said space being clean air which is exited through the aperture in said top member.

2. The air filter assembly of claim 1 wherein said one end of said cylindrical air filter element is attached to said top member and the other end of said cylindrical air filter element is attached to said base member.

3. The air filter assembly of claim 2 wherein the base portion of said conical filter element is attached to said base member.

4. The air filter assembly of claim 1 wherein the means for attaching the apex portion of said conical filter element to the inner walls of said cylindrical filter element comprises a brace attached to said apex portion, a rigid ring attached to the inner surface of said cylindrical filter element and brackets attached at one end to said brace and at the other end to said rigid ring.

5. An air filter assembly comprising:

a cylindrical air filter element;

a base member having an aperture formed therein;

a top member having an aperture formed therein;

one of the ends of said cylindrical air filter element being attached to said top member and the other of the ends of said cylindrical air filter element being attached to said base member;

the aperture of said top member being in opposing relationship to the end of said cylindrical air filter element attached to said top member;

an elongated conical filter element having an apex portion, the longitudinal outer wall of said conical filter element running opposite most of the inner wall of said cylindrical filter element;

the base portion of said conical filter element being attached to said base member;

the aperture of said base member being in opposing relationship to the base portion of the conical filter element; and means for attaching the apex portion of said conical filter element to the inner wall of said cylindrical filter element;

air to be cleaned being fed into the interior of said conical filter element through the base portion thereof, said air passing through the wall of said conical filter element into the space between the outer wall of said conical filter element and the inner wall of said cylindrical filter element, air to be cleaned further being passed through the wall of said cylindrical filter element into the space between the outer wall of said conical filter element and the inner wall of said cylindrical filter element, the air in said space being clean air which is exited through the aperture in said top member.

6. The air filter of claim 5 wherein the means for attaching the apex portion of said conical filter element to the inner wall of said cylindrical filter element comprises a brace attached to said apex portion, a rigid ring attached to the inner surface of said cylindrical filter element and brackets attached at one end to said brace and at the other end to said rigid ring.

7. The air filter of claim 5 wherein the walls of said conical and cylindrical filter elements are pleated.

* * * * *